May 29, 1923.

R. FEHRENBACH

HEATER AND THE LIKE

Filed July 16, 1921

1,456,725

INVENTOR
Reinhold Fehrenbach
by Byrnes, Stebbins, Burgess & Parmelee
his Attorneys Patented May 29, 1923.

1,456,725

UNITED STATES PATENT OFFICE.

REINHOLD FEHRENBACH, OF WESTVILLE, NEW JERSEY, ASSIGNOR TO WELSBACH COMPANY, OF GLOUCESTER CITY, NEW JERSEY, A CORPORATION OF NEW JERSEY.

HEATER AND THE LIKE.

Application filed July 16, 1921. Serial No. 485,200.

*To all whom it may concern:*

Be it known that I, REINHOLD FEHRENBACH, a citizen of the United States, residing at Westville, in the county of Gloucester and State of New Jersey, have invented a new and useful Improvement in Heaters and the like, of which the following is a full, clear, and exact description.

My invention relates to gas and electric and other heaters and the like, and is particularly applicable to a portable article of the type indicated, wherein the same is allowed to stand on the floor or other support.

An object of my invention is to so arrange the mass of such an article that when the same falls, accidentally or otherwise, so that the heating element would otherwise come into contact with the floor or other support and ignite the same, the device will automatically turn by reason of the distribution of its mass so as to remove the heating element a safe distance from the floor or other support.

A further object of my invention is to accomplish this purpose efficiently by a simple device and without any extra moving parts.

Figure 1:
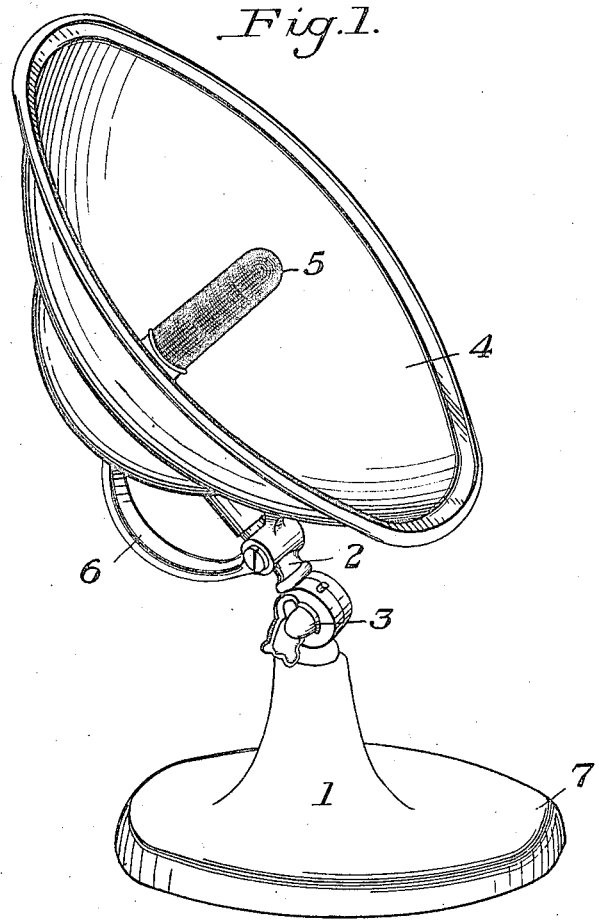
Figure 2:
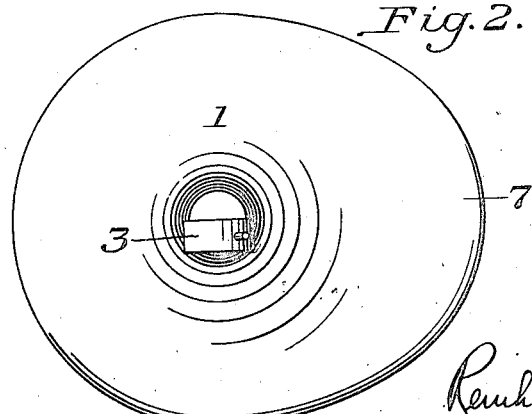

Further objects and advantages of my invention will be apparent from a reading of the following description taken in connection with the accompanying drawing illustrating one of the many embodiments of my invention, and in which:

Figure 1 is a perspective view of a heater with my invention applied thereto; and Figure 2 is a plan view of the base of the heater, illustrating the distribution of the mass.

In the drawing, a base 1 is provided with supporting means 2, the base and supporting means being adjustably connected together by a joint 3. The device illustrated is a gas heater comprising, in addition to the parts specified, a reflector 4, a heating element 5 and a handle 6.

The base 1 is provided with an eccentric portion 7, the same being placed at the front of the heater, so that in the event of the heater being tipped over by any means, the device will be in a condition of unstable equilibrium by reason of the eccentric portion 7, and will therefore turn so as to remove the heating element 5 from proximity to the floor or other supporting surface.

My invention is applicable to any device, wherein it is desired to remove a heating element from proximity to its supporting surface in the case of accident, and is therefore not limited to gas heaters, and of course to no particular type or character of heater.

Many other embodiments of my invention will suggest themselves, and I am therefore not to be limited to the exact manner of applying the principle of my invention, and desire not to be limited except by the claims appended hereto.

I claim:

1. In a heating device adapted to occupy a normal safe position, a heating element, and means whereby when the device is upset said heating element is moved to a predetermined safe position other than said normal safe position.

2. A heating device having a heating element and a supporting structure for holding the element in its normal position, and having its mass distributed when in an accidental position so as to move the heating element to a predetermined safe position other than its normal position relative to the supporting surface.

3. A heating device having a heating element and a supporting structure normally holding the heating element in a safe position, and having its mass distributed so that said device when in an accidental position is in unstable equilibrium until said heating element is a safe distance from the supporting surface and in a position other than its normal position.

4. A heating device having a base, and a heating element and a supporting structure normally carried by said base, said base having a mass disposition rendering said device in unstable equilibrium when in an accidental position until said device is in a position other than normal to direct its heat away from the supporting surface.

5. In a heating device, a heating element, a reflector for said element, said heating device being adapted to occupy a normal safe position, and means for rendering said device in unstable equilibrium when in an accidental position until said reflector assumes a position other than normal and directs the heat away from the supporting surface.

6. In a heating device, a reflector, a heating element in said reflector, and means on the device acting to place the same in unstable equilibrium when in an accidental position until such time as said reflector assumes a position other than normal and directs the heat of the device away from the supporting surface.

7. In a heating device, a reflector, a heating element in said reflector, and a base having forwardly projecting means acting when said device is thrown forward to an accidental position to place the same in unstable equilibrium until it turns by gravity to a position other than normal and in which the reflector directs the heat away from the supporting surface.

8. In a heating device, a base, a support carried by said base and adjustable backward and forward, and a reflector and heating element on said support, said base comprising means acting when said device is in an accidental position to maintain the same in unstable equilibrium until it is in a position other than normal such that the reflector directs the heat away from the supporting surface.

9. In a heater, a base having a supporting surface for maintaining the heater in normal safe position, and having an edge eccentrically disposed with respect to the heater and insuring a single predetermined position of the heater while upset in which the parts are in stable equilibrium.

10. In a heater, a base having a supporting surface for maintaining the heater in normal safe position, and having an edge providing rolling contact when the heater is upset, said base having its mass so disposed as to insure rolling of said base to predetermined safe position other than normal safe position of the heater.

In testimony whereof, I have hereunto set my hand.

REINHOLD FEHRENBACH.